INVENTOR.
JOHN S. LARKINS JR.
BY
M K Murphy
ATTORNEY

April 25, 1961     J. S. LARKINS, JR     2,981,822
ELECTRICAL MACHINING APPARATUS
Filed Feb. 16, 1959     13 Sheets-Sheet 3
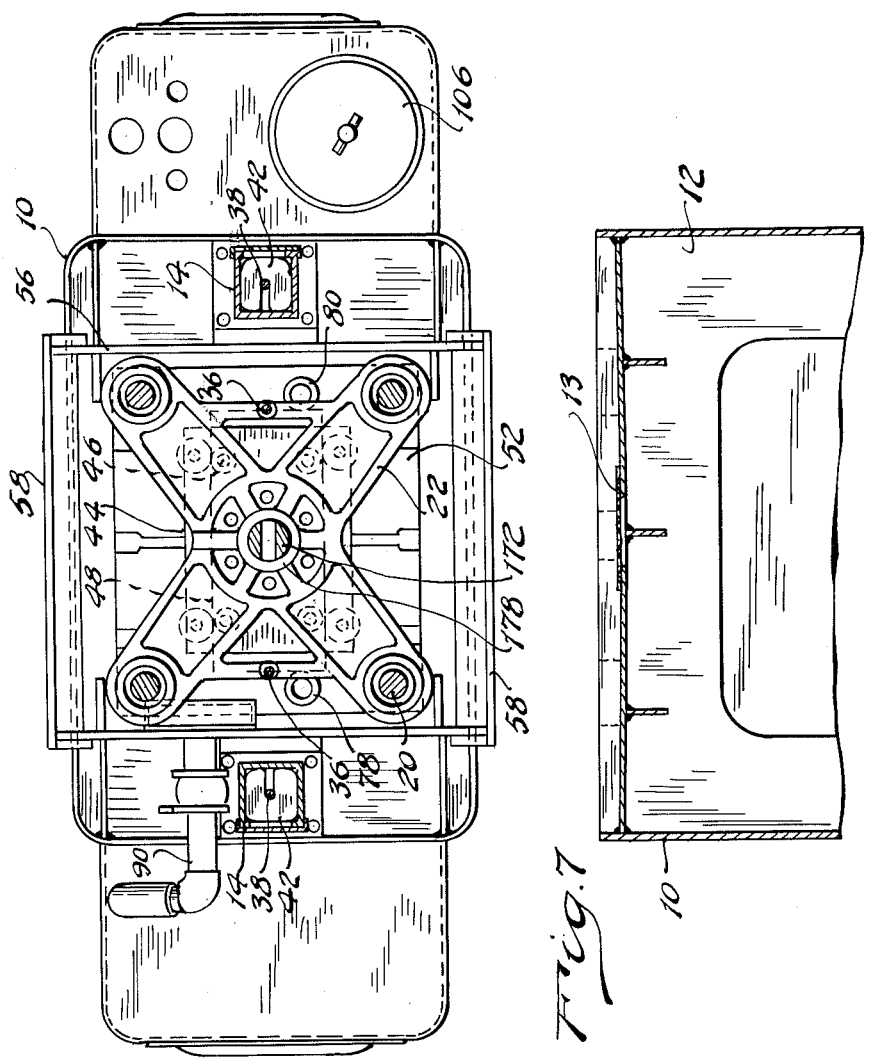
INVENTOR.
JOHN S. LARKINS JR.
BY
ATTORNEY

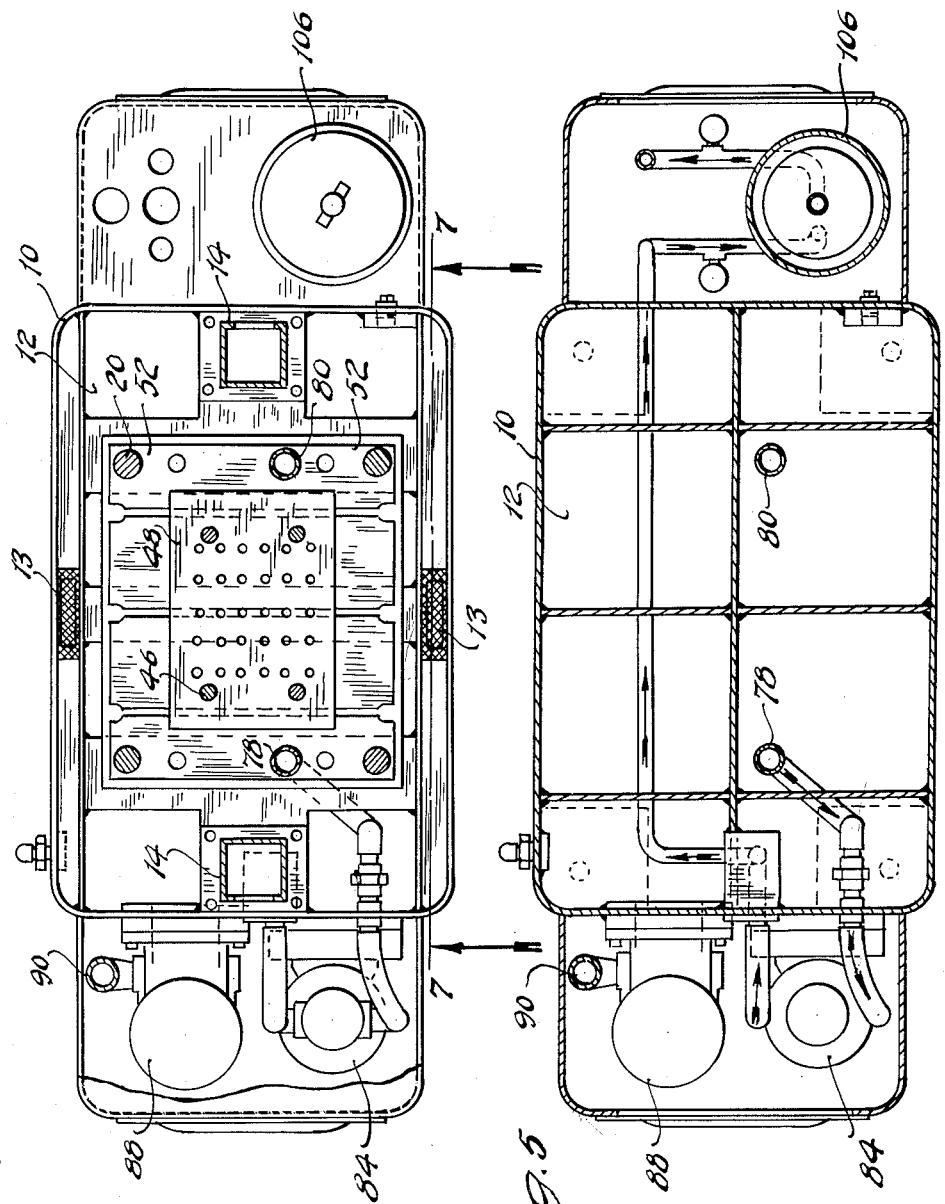

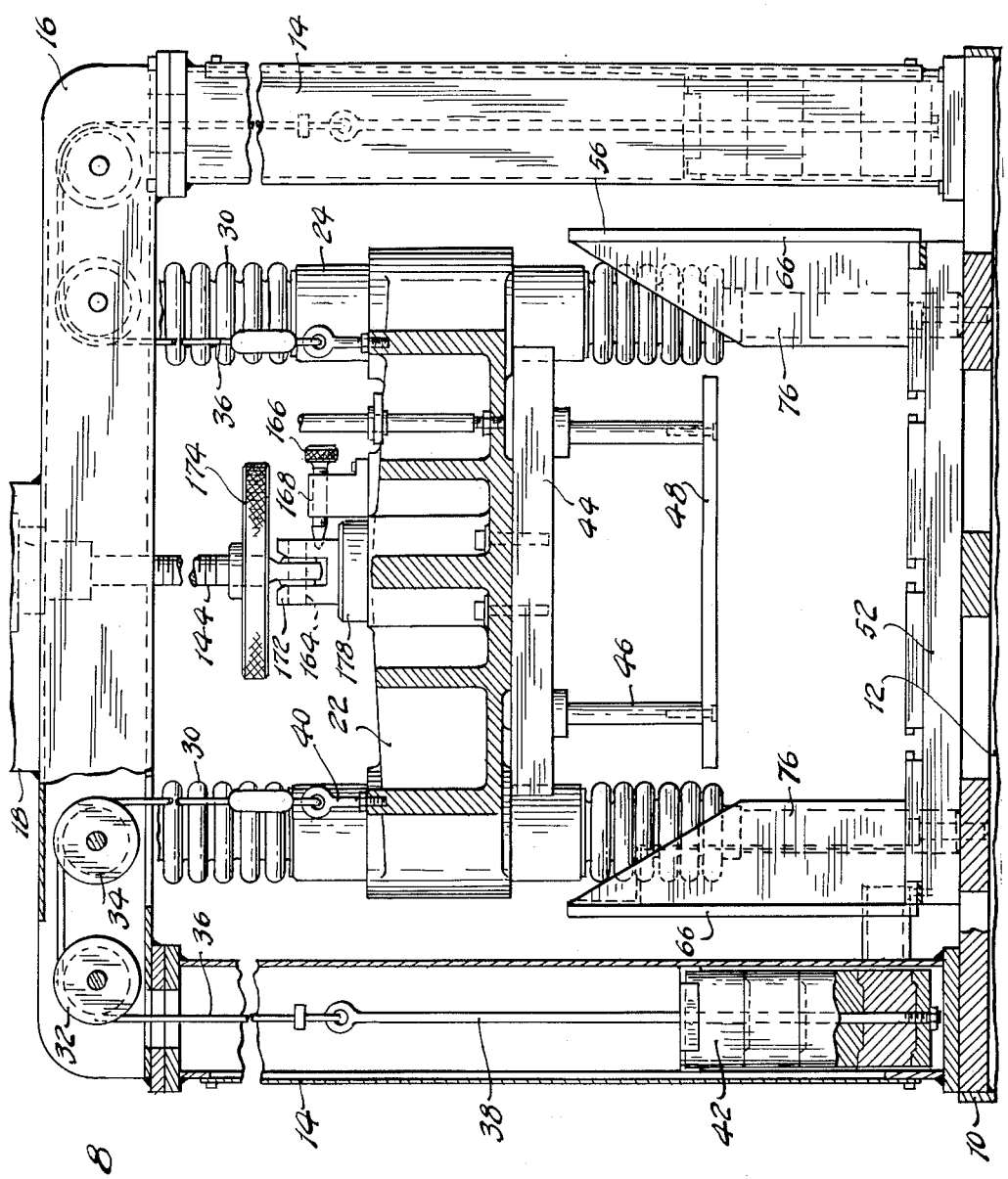

April 25, 1961  J. S. LARKINS, JR  2,981,822
ELECTRICAL MACHINING APPARATUS
Filed Feb. 16, 1959  13 Sheets—Sheet 6

INVENTOR.
JOHN S. LARKINS JR.
BY
M. T. Murphy
ATTORNEY

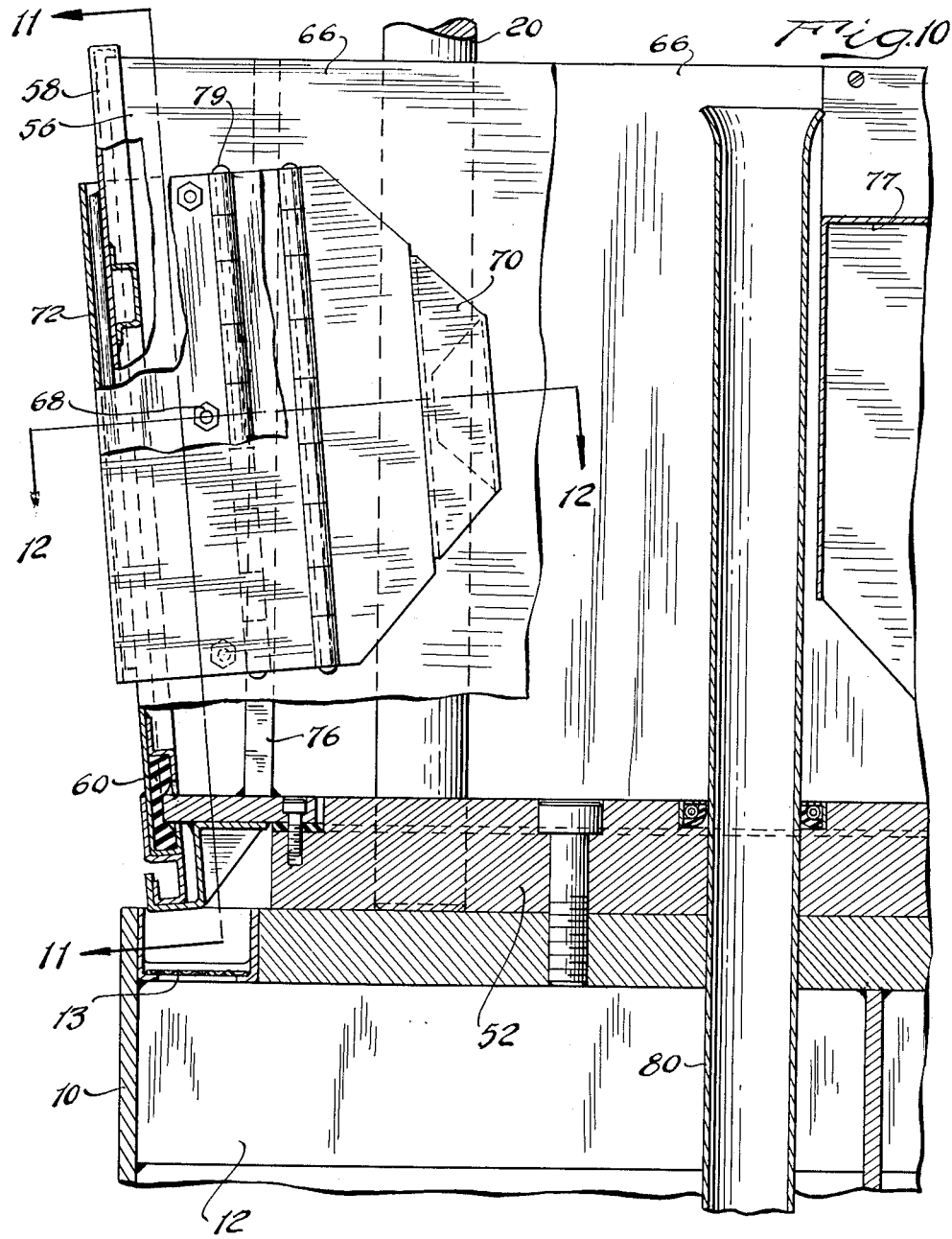

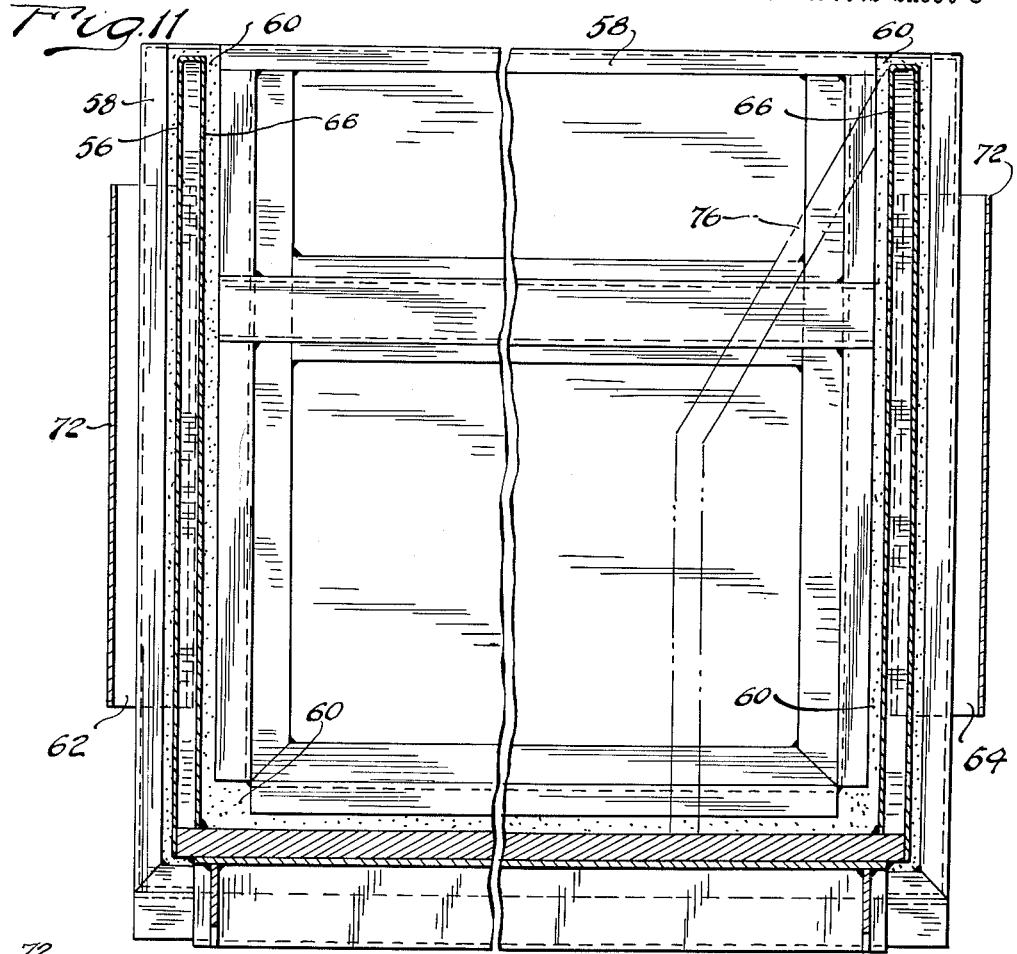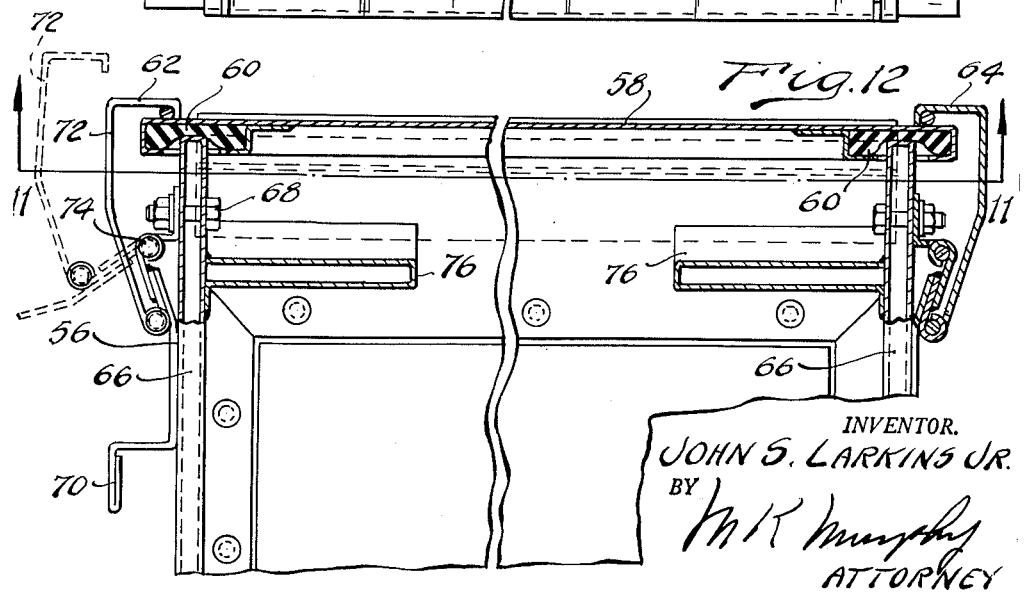

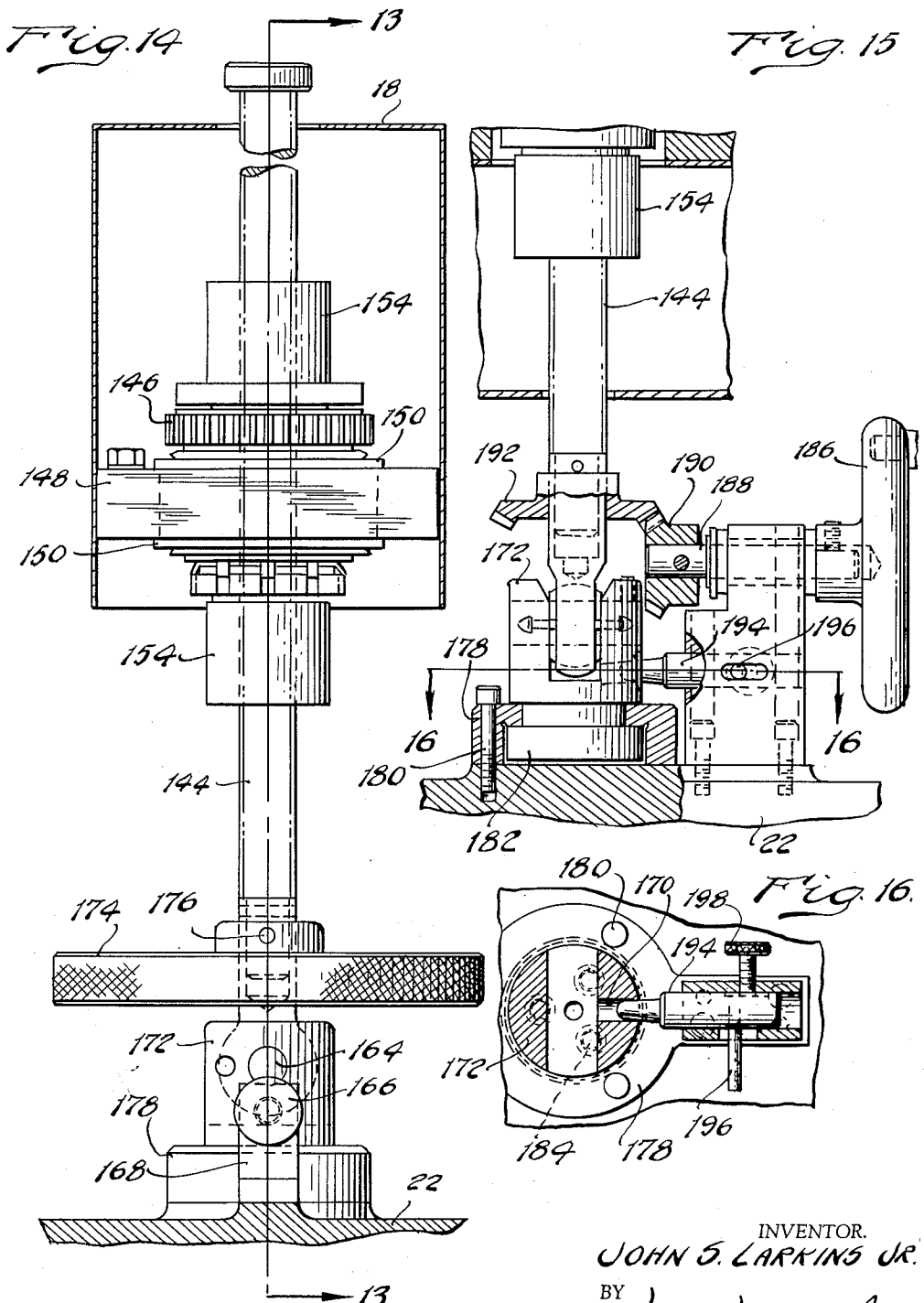

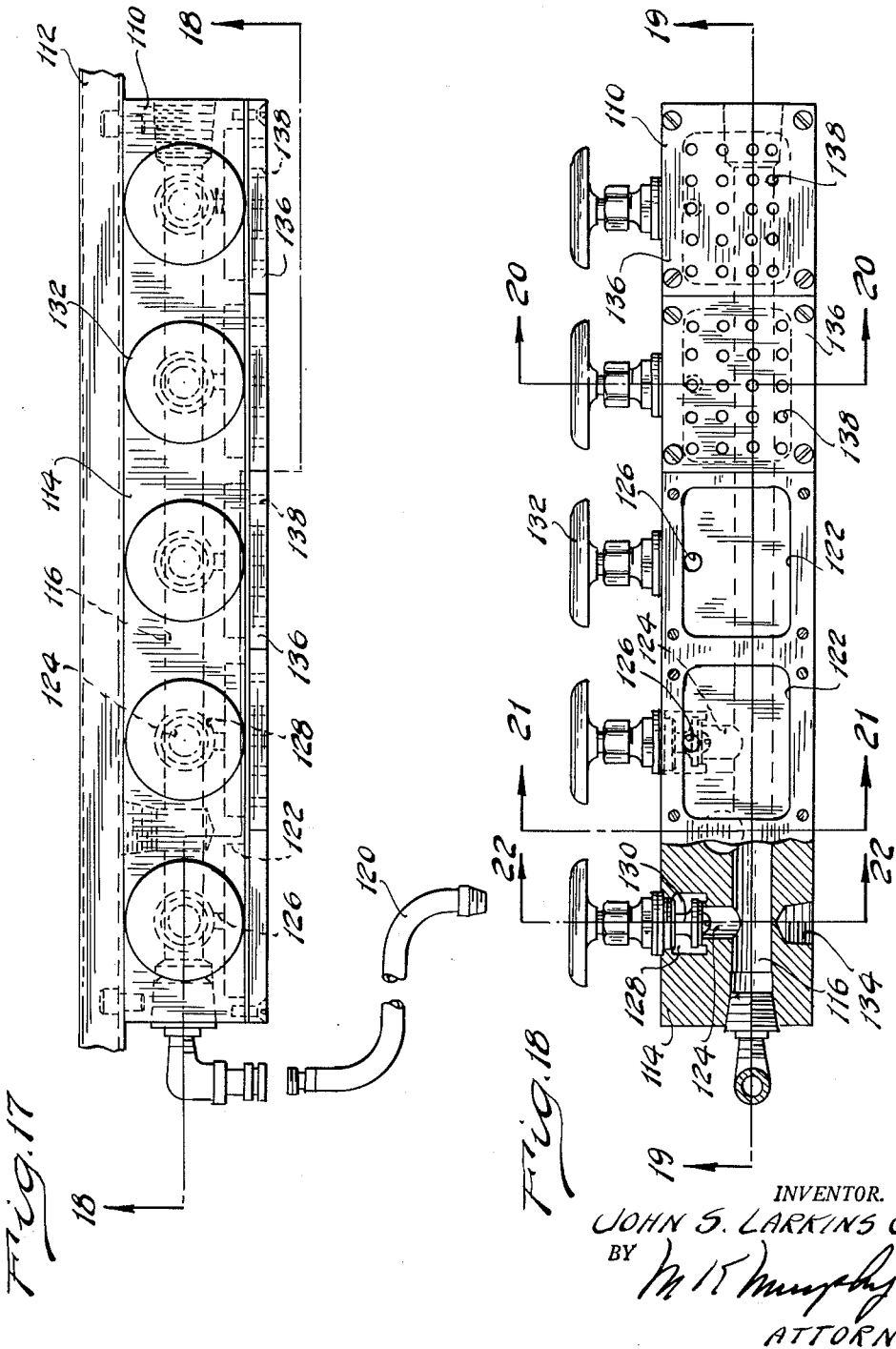

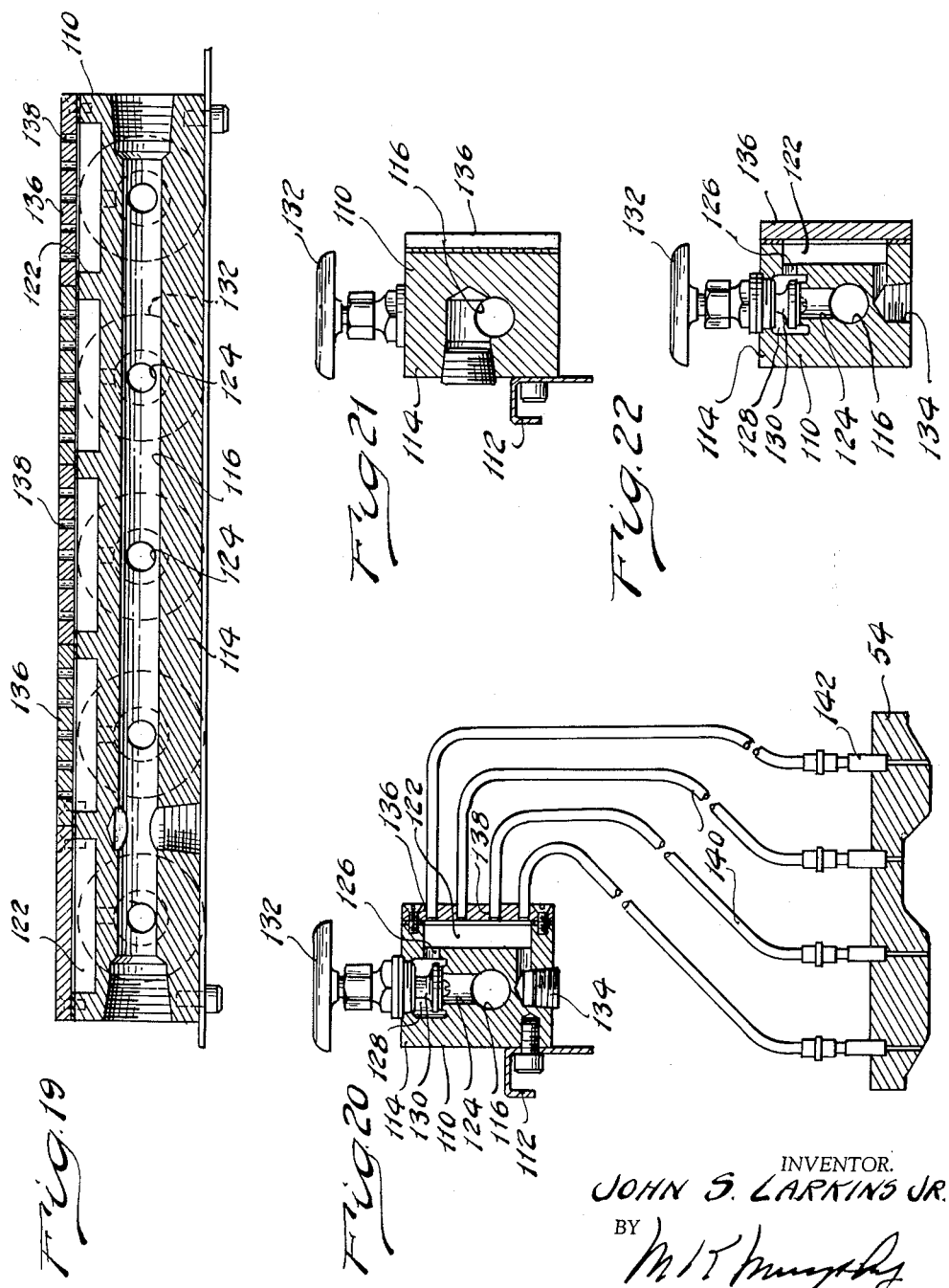

April 25, 1961 J. S. LARKINS, JR 2,981,822
ELECTRICAL MACHINING APPARATUS
Filed Feb. 16, 1959 13 Sheets-Sheet 13

INVENTOR.
JOHN S. LARKINS JR.
BY
ATTORNEY

United States Patent Office 2,981,822
Patented Apr. 25, 1961

2,981,822

ELECTRICAL MACHINING APPARATUS

John S. Larkins, Jr., Birmingham, Mich., assignor to Elox Corporation of Michigan, Royal Oak, Mich., a corporation of Michigan Filed Feb. 16, 1959, Ser. No. 793,469

4 Claims. (Cl. 219—69)

This invention relates to machine tools for electrical-discharge-machining and for electro-chemical-machining.

During recent years rapid strides have been made in the art of machining hard metals and alloys by electrical erosion. Two principal types of apparatus are in use. Electrical-discharge-machining apparatus erodes the workpiece by passing intermittent, high frequency, short duration, electrical discharges across a gap from an electrode to the work through a dielectric coolant. Electro-chemical-machining erodes the workpiece by passing a steady current across a gap between the electrode and workpiece through an electrolyte.

Each of the aforementioned machining processes has particular application to certain problems and frequently, for example in the manufacture of forging and stamping dies, the roughing is done by electro-chemical-machining (called ECM) and the finishing by electrical-discharge machining (called EDM). The type of machine, power feed apparatus for advancing and retracting the electrode, coolant handling equipment, etc., is generally similar for for both types of machining, although the power supplies differ.

Difficulty has been experienced recently in both types of machining when attempts have been made to apply the processes to the machining of large workpieces such as, for example, the machining of die cavities for large forgings and stampings. Some of the electrodes used in such machining are several hundred square inches in area and have correspondingly great weight. The gap spacing employed is in the order of a thousandth of an inch or less, and the automatic power feed mechanism for handling such a large electrode must be of adequate size and power.

It is the object of my invention to provide a machine tool suitable for both EDM and ECM which will handle large, heavy electrodes, will furnish steady support for the large capacity power feed mechanism, and which will have adequate means for handling the coolant used.

Other objects and advantages of my invention will be apparent from the following specification which, taken in conjunction with the accompanying drawings, shows and describes preferred embodiments of the invention.

In the drawings:

Fig. 3 is a sectional plan view taken on the line 3—3 of Fig. 1;

Figure 1:
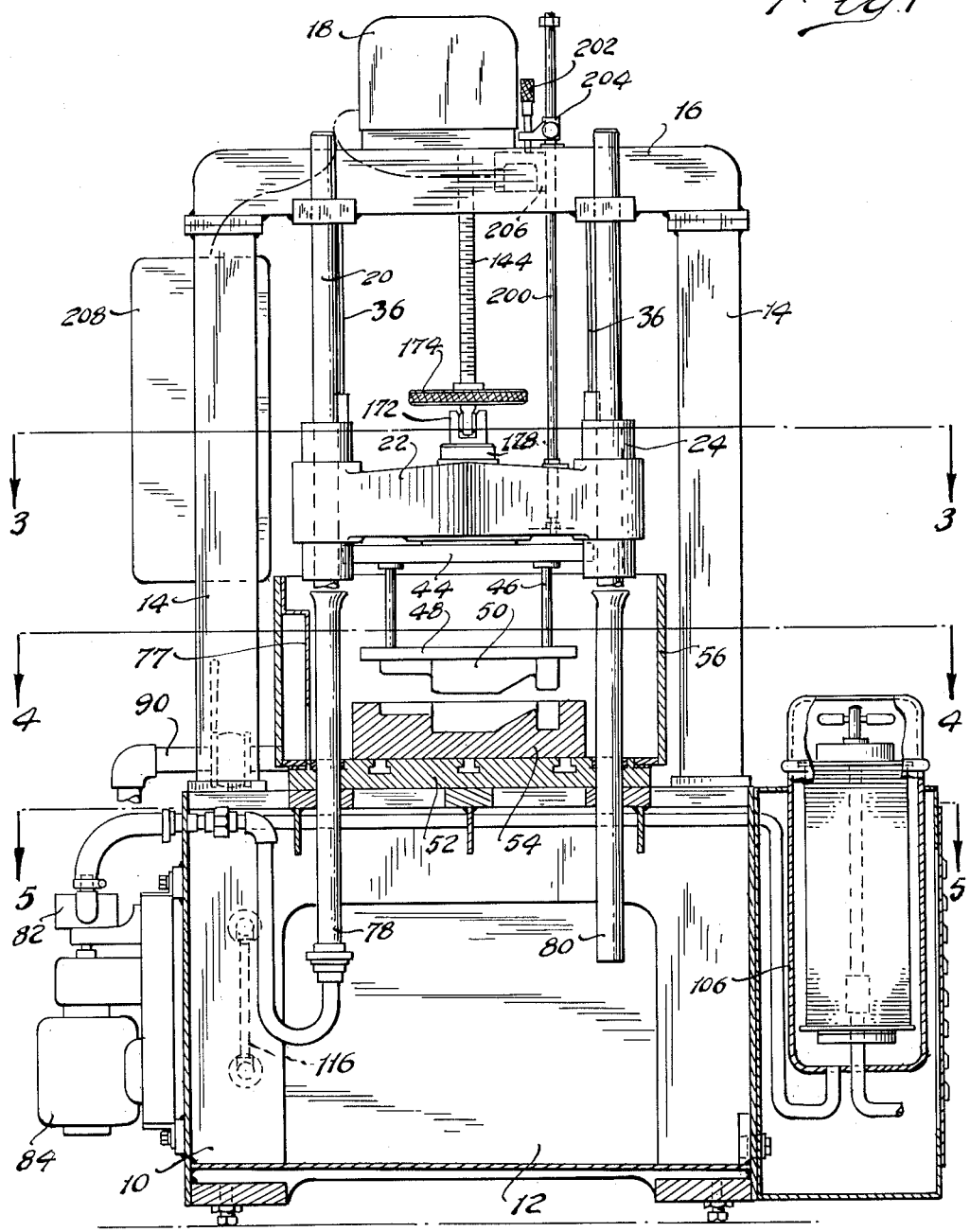
Fig. 1 is a front elevation of a machine especially adapted for EDM, with some parts shown in section.
Figure 2:
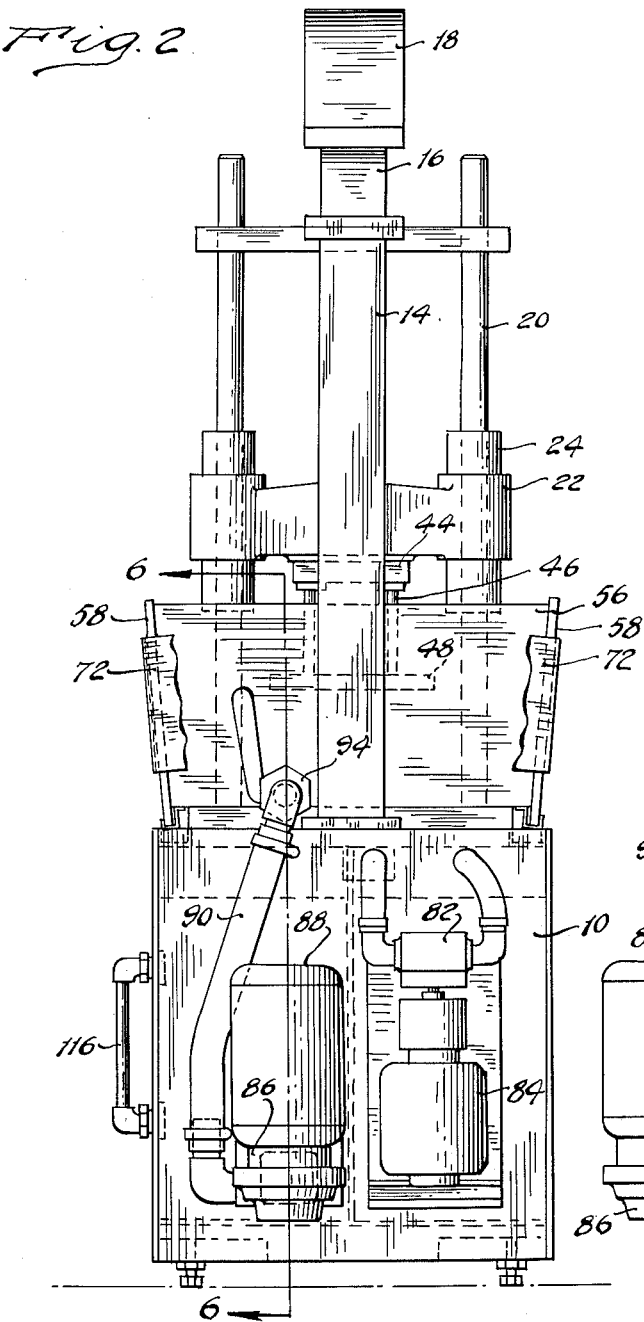
Fig. 2 is a left hand elevation of the machine shown in Fig. 1.
Figure 6:
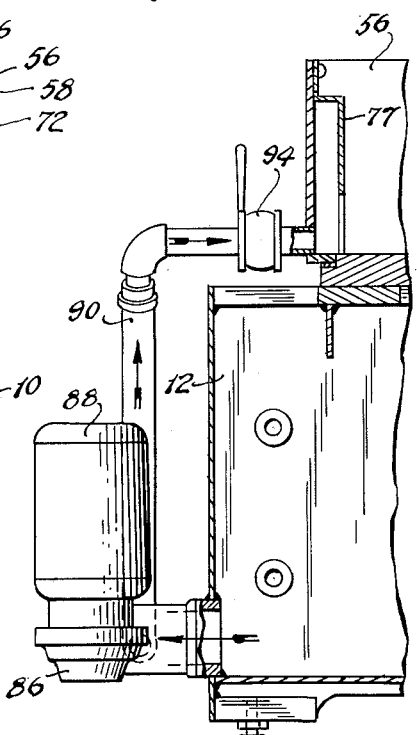
Figure 9:
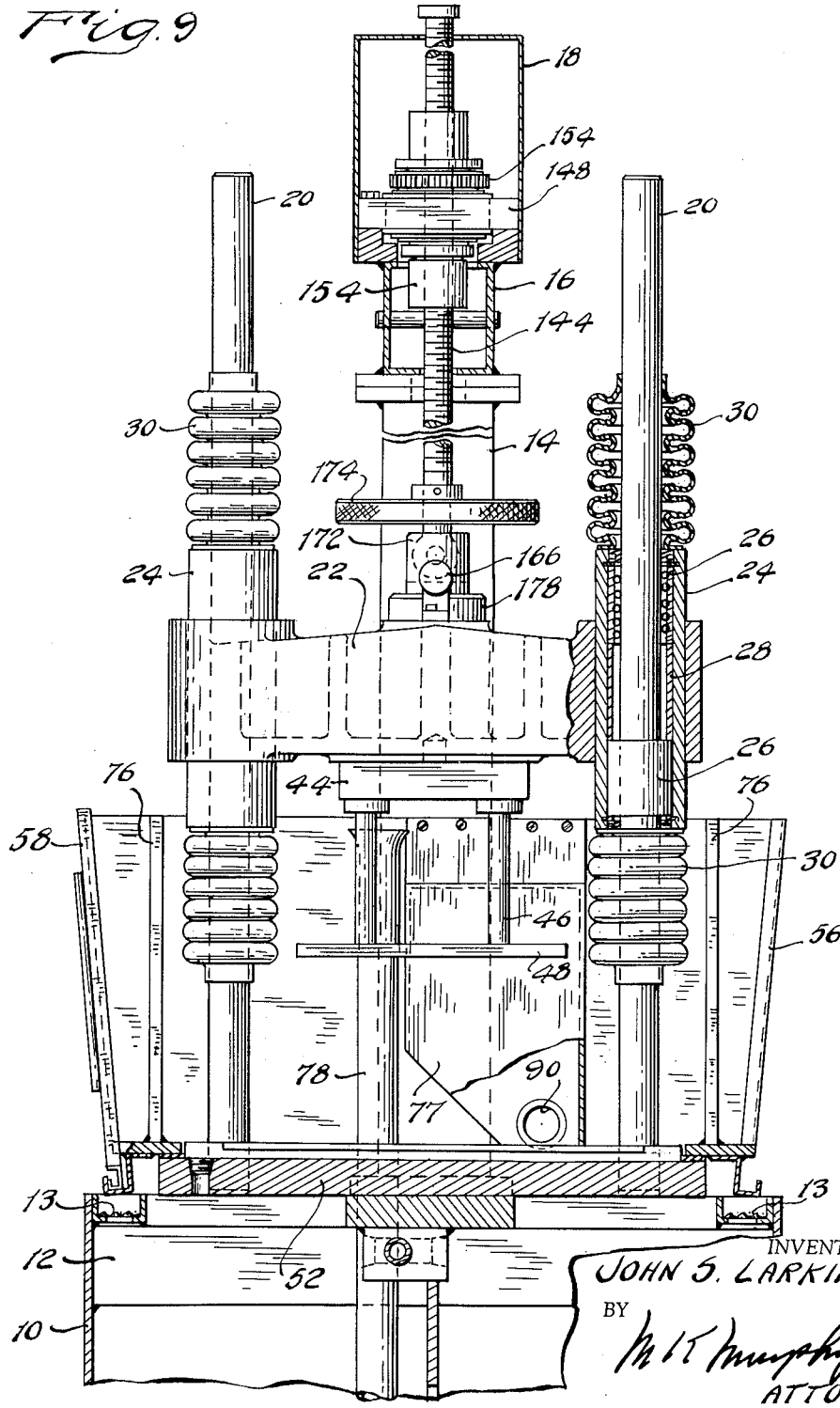
Figure 13:
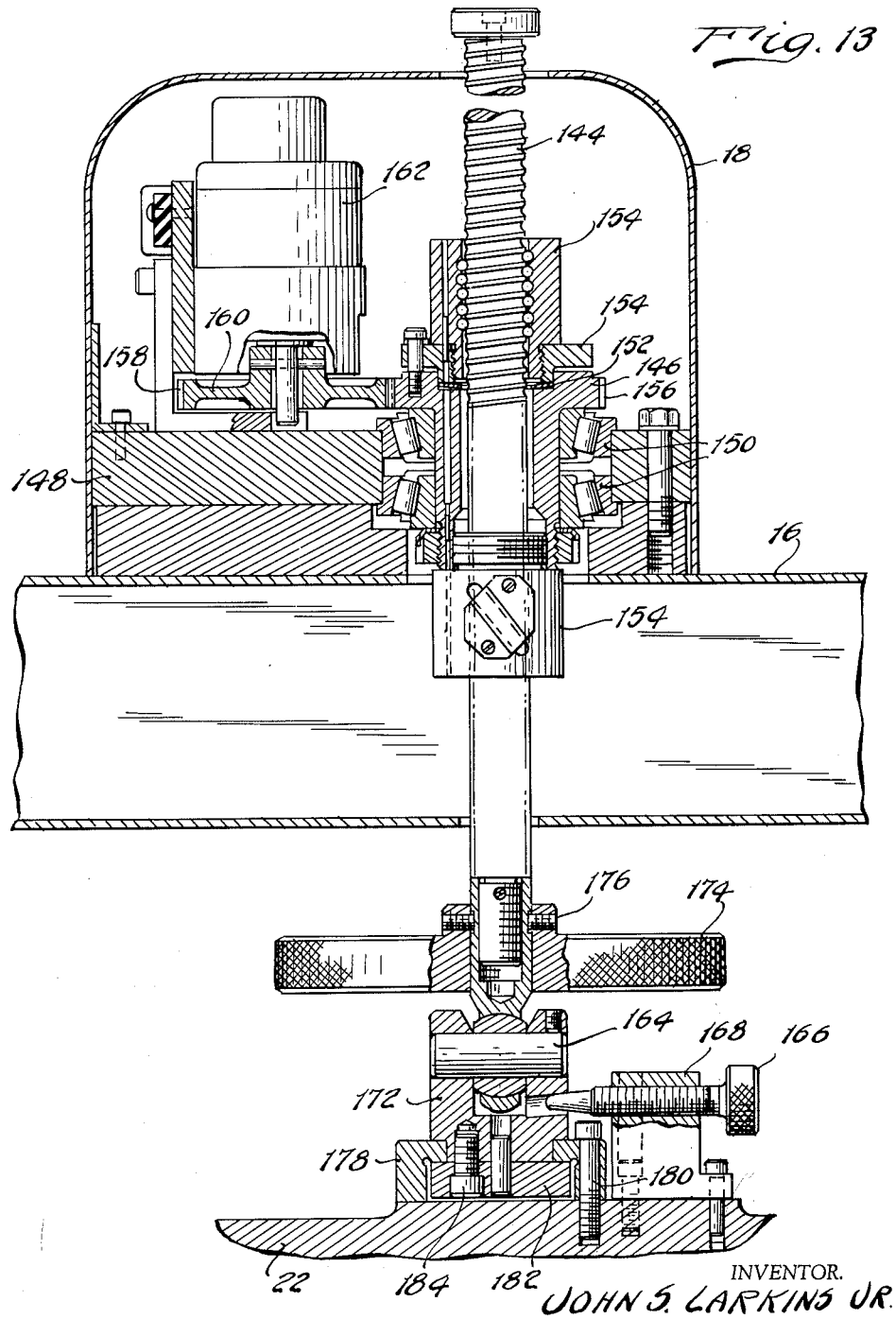
Figure 23:
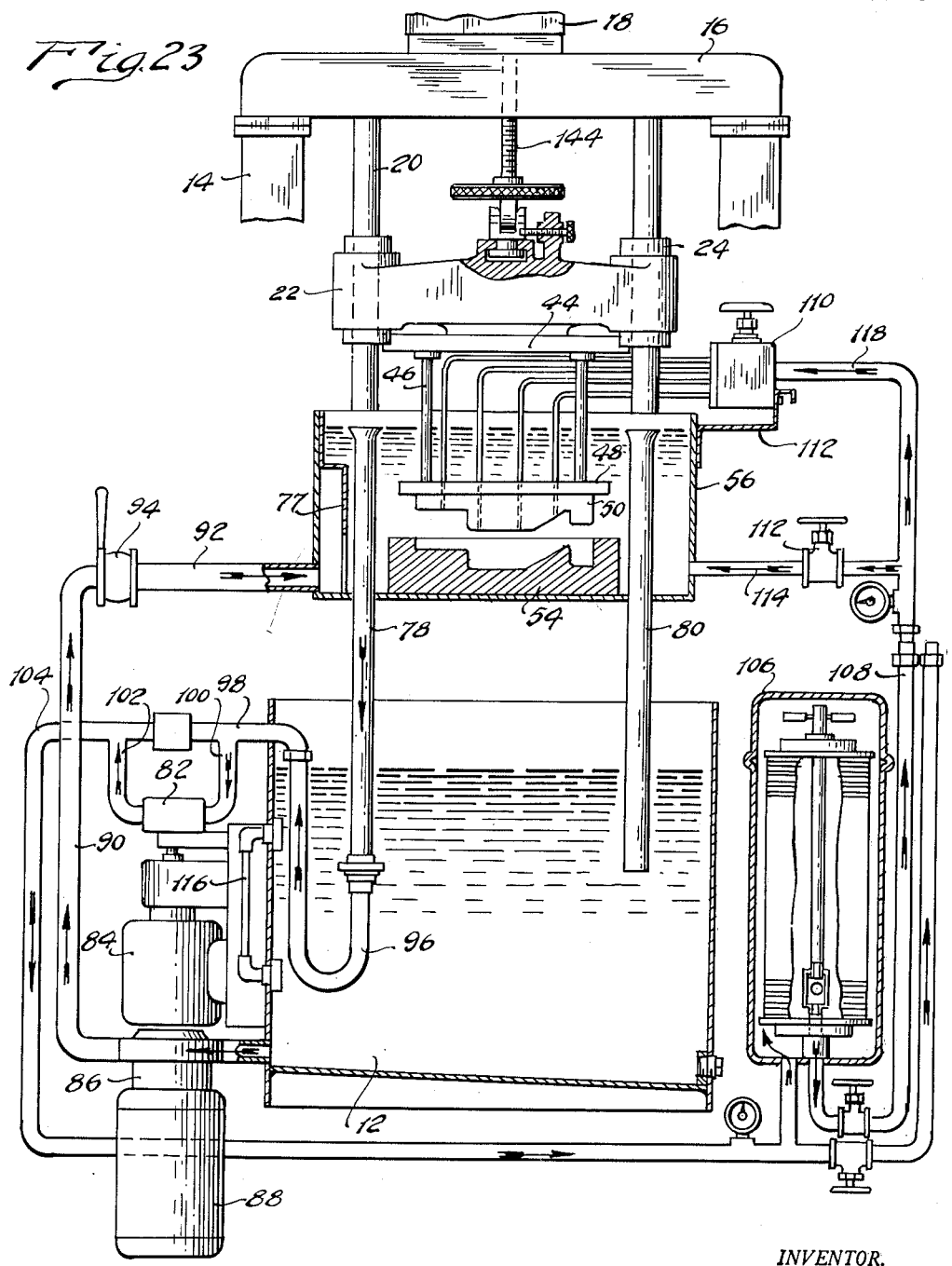

Figs. 4 and 5 are similar views taken respectively on lines 4—4 and 5—5 of Fig. 1;

Fig. 6 is a sectional view taken on line 6—6 of Fig. 2;

Fig. 7 is a sectional view on the line 7—7 of Fig. 4;

Fig. 8 is an enlarged detail of the power feed counterbalance with some parts in section;

Fig. 9 is an enlarged vertical sectional view of the upper portion of the machine;

Fig. 10 is an enlarged sectional detail of the coolant tank and door clamping means;

Figs. 11 and 12 are sections taken respectively along lines 11—11 and 12—12 of Fig. 10;

Fig. 13 is an enlarged sectional detail of the power feed portion of the machine as viewed along line 13—13 of Fig. 14;

Fig. 14 is a left hand side view of the power feed mechanism;

Fig. 15 is a sectional detail of a modified form of power feed mechanism;

Fig. 16 is a section along line 16—16 of Fig. 15;

Fig. 17 is a plan view of the coolant manifold;

Fig. 18 is a section along line 18—18 of Fig. 17;

Figs. 19, 20, 21 and 22, are sections along lines 19—19, 20—20, 21—21 and 22—22 respectively of Fig. 18; and Fig. 23 is a schematic view of the coolant circulation in the machine.

Referring now to the various figures, it will be seen that the machine comprises a base structure 10 having a coolant tank 12 mounted in the lower section thereof. A pair of hollow uprights 14 of rectangular section are mounted in the base structure and support a horizontal beam 16 which carries the power feed motor and other components in housing 18.

The base also carries four vertically disposed posts 20 arranged rectangularly. These posts carry a spider 22 (see Figs. 1–3 and 9) which is vertically movable thereon. The spider 22 is a relatively heavy section fabricated member and carries in the outer portion of each leg a heavy cylindrical bushing 24 which is fixed thereto. Suitably secured inside each bushing 24 are a pair of ball bearing assemblies 26 spaced apart by a spacer 28. The bearing assemblies provide a relatively long bearing between the spider 22 and the posts 20, the surfaces of which are ground and polished, and permit the spider to be reciprocated vertically on the posts with minimum frictional resistance and with precise alignment both vertically and horizontally. Boots 30 of bellows form made from rubber or other suitable material are preferably clamped to the posts and bushing members 24 at each end thereof to protect the surfaces of the posts and the bearings from contamination.

Referring to Figs. 3 and 8, it may be seen that the spider 22 is suspended for easy up-and-down movement on the posts 20 by a counterbalance mechanism. Spaced pulleys 32, 34, are mounted in the left hand portion of beam 16 as shown in Fig. 8. A flexible cable 36 is trained over the pulleys with one end thereof attached to a rod 38 and the other end to the spider 22 by means of an eye member 40. The rod 38 carries a plurality of weights 42, the number of which may vary with the size of the spider and the weight of electrode to be used. An identical counterbalance is provided for the opposite side of the spider, the counterbalance weights in both instances being freely movable inside the hollow uprights 14 in accordance with up-and-down movement of the spider 22 as controlled by the power feed mechanism which is to be described.

The spider is provided with an electrode holder 44 which includes depending posts 46 and a horizontal member 48 to which may be attached an electrode 50 such as that shown in Fig. 1. The holder 44 is made of suitable dielectric material and electrically insulates the posts 46 and member 48 from the machine. The clearance between members 44 and 48 permits connection of the coolant supply tubes as will be explained. The base of the machine has a relatively heavy bolster plate 52 on which a workpiece such as the one designated 54 may be supported. In practice, the electrode is clamped to the bolster by suitable clamps to prevent accidental displacement and to insure good electrical contact.

A coolant pan or tank 56 is disposed on the bolster in such manner that the electrode, working gap and workpiece will be surrounded by coolant solution during operation of the machine. The tank has a fixed bottom, back and sidewalls, and a removable front wall 58 (Figs. 10–12). By removing the front wall of the pan, as shown in Fig. 9, the electrode holder, bolster and other parts are completely exposed, thus facilitating job set-up and checking of the workpiece before machining is completed, if such is necessary.

The removable front wall 58 carries gaskets 60 along its inner bottom and side portions, which gaskets are of resilient synthetic material and are grooved as shown such that they form a fluid-tight seal with the bottom and sidewalls of the tank when the front wall is clamped in place. A pair of sheet-metal toggle clamps 62, 64, are used to clamp the front wall in place. These clamps are carried by the tank sidewalls 66 by means of bolts 68 and each has a handle portion 70 and a clamp portion 72. The clamp portion 72 is adapted to engage the front surface of the front wall 58 and to exert clamping compressive force thereon when the handle is pivoted about the pivot bolt 74, as will be readily understood from Fig. 12. This figure shows also the shields 76 which guard against damage to posts 20 or boots 30 during placement or removal of workblock 54 and baffles 77 which reduce turbulence in the tank during rapid fill or drain.

Mounted in the bolster 52 are a pair of standpipes 78, 80. The pipe 80 is an overflow pipe and connects the pan 56 with reservoir tank 12 while pipe 78 is the coolant inlet pipe which circulates the coolant solution through the system. The pipe 78 is adjustable in height and may be lowered such that the intake is about 1 inch under the surface of the fluid to provide good natural settlement of contaminants prior to pumping and filtration (Figs. 1, 2 and 23). Pump 82 is driven by a motor 84 and is the pump which circulates the coolant through the filter and through the working gap. A second pump 86 is provided for rapidly filling and emptying the pan 56. The latter is driven by a motor 88.

In Fig. 23 which, together with Figs. 17–22 inclusive, show the coolant system in detail, the pump 86 and motor 88 have been shown in displaced position for clarity. It may be seen from Fig. 23, that pump 86 (which is reversible by means of a switch not shown) is operable to rapidly fill or empty pan 56 through pipes 90, 92, under control of manual valve 94. Thus when a job is set up and the front wall 58 clamped in place, the pan 56 may be filled quickly by starting the motor 88 which drives the high capacity pump 86. The pan may likewise be quickly emptied by reversing the motor and opening valve 94.

During machining, coolant from the pan 56 flows through pipe 78, hose 96, pipes 98, 100, pump 82, and pipes 102, 104, to filter 106. After passing through the filter, the fluid flows through pipe 108 to coolant manifold 110 from whence it is distributed to the coolant pressure ports in the electrode. Valve 112 permits filtered coolant to be pumped directly into pan 56 through pipe 114 if desired. A gauge 116 is mounted on the side wall of the reservoir 12 to show fluid level therein.

The manifold 110 is mounted on one side of the pan 56 by means of a bracket 112 (Fig. 23) and comprises an elongated body member 114 having a central passage 116 fed from pressure pipe 118 through hose 120. The manifold is divided into five sections, any one or more of which may be shut off by means of manually operable valves. A greater or lesser number of sections may be provided for machines of larger or smaller capacity.

As will be seen from the drawings, the manifold body 114 is provided with five chambers 122, each of which communicates with the central passage 116 through internal passages 124, 126, and valve chamber 128. A plunger type valve 130, operated by hand wheel 132 is provided for each manifold section such that communication between passage 116 and chambers 122 may be selectively controlled. An outlet port 134 is provided in one or more of the manifold sections for use with small electrodes requiring only one or two coolant holes (Figs. 20 and 22). For supplying coolant to large electrodes, each chamber 122 is provided with a cover plate 136 provided with a plurality of holes 138. Flexible hoses 140 connect these holes with passages in the electrode 50 through suitable connector fittings 142 (Fig. 20).

Thus it will be seen that the manifold 110 may be readily adapted to take care of the coolant circulation for a variety of electrodes of different form and size, from the smallest to the largest handled by the machine. As shown, each manifold section will supply twenty hoses, thus providing coolant to one hundred electrode coolant passages which is sufficient for a very large electrode. Smaller electrodes are accommodated by shutting off manifold sections by closing valves 130. Coolant flowing from filter 106 under pressure of pump 82 will flow through the manifold passages and chambers, through hoses 140 and the electrode passages into the gap between the electrode and workpiece and into pan 56 where it will be returned to the circulation system through pipe 78 or overflow pipe 80.

The power feed mechanism of the machine is best illustrated in Figs. 9 and 13–16 inclusive. It comprises a screw 144 mounted in a rotatable nut 146. The latter is mounted in a block 148 which is rigidly supported on the upper beam 16 of the machine. A double row roller bearing 150 is provided between the block and nut. Rotational drive between the nut 146 and screw 144 is transmitted by means of spaced ball-nut members 154 of the low-friction circulating ball type. A Belleville spring 152 is disposed between the nut 146 and retaining member 154 at the top of the nut to eliminate backlash.

The nut 146 is provided with gear teeth 156 which mesh with teeth 158 of a gear 160 carried by the shaft of power feed motor 162. At its lower end, screw 144 is provided with an opening for a pin 164 which forms part of the connection of the screw to the spider 22.

It thus may be seen that rotation of the armature shaft of motor 162 which carries gear 160, will rotate nut 146 in the bearing 150 and cause up-or-down translation of screw 144 and spider 22 in accordance with the direction of motor rotation. In practice, motor 162 is controlled by an automatic power feed sensing and amplifier circuit which may be set to maintain an optimum gap spacing between the electrode 50 and the workpiece 54 and to feed the electrode into the work as machining progresses. For an example of such a power feed control, reference is made to the co-pending application of Robert S. Webb, Serial No. 756,164, filed August 20, 1958, and assigned to the assignee of this application.

For quick manual adjustment of the position of spider 22 during set-up and inspection, or when changing electrodes, means is provided for turning screw 144. A screw-threaded pin 166 is carried in a block 168 mounted on the spider 22 adjacent the connection to screw 144. The pin 166 has a tapered end which is adapted to engage a hole 170 in connecting yoke 172. The latter has a reduced portion which fits in an upwardly facing opening in a collar 178 fastened to the spider 22 by screws 180. An annular member 182 is secured to the yoke 172 by screws 184 before the collar 178 is attached to the spider. With the pin 166 engaged in hole 170, there can be no rotation of the spider 22 with respect to screw 144. However, when pin 166 is backed out of hole 170, the screw 144 may be turned by handwheel 174 fastened to the screw by set screws 176, and if motor 162 is stationary, nut 146 will be held stationary and rotation of wheel 174 will cause vertical translation of the screw and the spider 22 will be raised or lowered in accordance with the direction of handwheel rotation, the necessary rotative movement with respect to the spider being taken care of by parts 178, 182.

Figs. 15 and 16 show a modified form of this manual adjusting means wherein the handwheel 186 is mounted on a horizontal shaft 188 which drives screw 144 through bevel gears 190, 192. A pin 194 functions similarly to the pin 166 and is slidable into engagement with hole 170. The pin is moved by a pin 196 which slides in slot 197 and is secured in place by a thumb screw 198.

Referring to Fig. 1, a rod 200 is secured at its lower end to the spider 22 and is slidably supported along its upper portion in beam 16. The rod carries a micrometer 202 which is slidably secured thereto by an arm 204. A microswitch 206 is mounted on the beam such that it is adapted to be actuated by the micrometer plunger when the spider has descended to a preset point. The switch 206 is connected into the circuit of motor 162 and functions to cut off the motor and thus immobilize the screw 144 when the electrode 50 has cut the workpiece cavity to preselected depth.

A control panel 208 is mounted on one of the uprights 14 and may contain various meters, gauges, manual switches, etc., for operation of the machine.

It will be seen, therefore, that I have shown and described a preferred form of machine for accomplishing the objects above set forth.

I claim:

1. In a machine for metalworking by electroerosion, a base having means for supporting a workpiece, posts extending upwardly from said base, a spider suspended above the workpiece and slidable on said posts, means carried by said spider for supporting an electrode, power means for moving said spider vertically on said posts comprising an elongated screw having its lower end secured to said spider, a nut threadedly engaging said screw and rotatably supported in said machine above said spider, and a motor drivingly connected to said nut.

2. The combination set forth in claim 1 wherein the screw and spider are secured together by means of a rotatable connection, means for rendering said connection non-rotatable, and manual means for rotating said screw when said connection is rotatable whereby the position of said spider may be manually adjusted.

3. In a machine for metalworking by electroerosion, means for supporting a workpiece, means for suspending an electrode above said workpiece and for advancing and retracting the electrode with respect to the workpiece, a fluid manifold for distributing coolant to the electrode comprising a body having a supply passage and a plurality of distribution chambers, valve means for selectively connecting said passage with said chambers, each of said chambers having an outer wall provided with a plurality of openings, and flexible conduit means connecting said openings with corresponding passageways in said electrode.

4. In a machine for metalworking by electroerosion, a base, a coolant tank carried by said base having bolster means for supporting a workpiece within said tank in electrical contact with said bolster, a support beam rigidly supported by and above said base, a plurality of posts carried by said base and extending upwardly therefrom within the lateral confines of said tank, a spider slidably mounted on said posts, means carried by said beam for suspending said spider for vertical movement including means for counterbalancing the weight of said spider, power driven means carried by said beam for reciprocating said spider on said posts, an electrode holder suspended from said spider in spaced relation therewith and electrically insulated therefrom, coolant distribution holes in said holder, a fluid distribution manifold, and flexible conduits connecting said manifold and said holder for supplying fluid to an electrode supported in said holder.

References Cited in the file of this patent

UNITED STATES PATENTS

| | | |
|---|---|---|
| 1,187,543 | Murray et al. | June 20, 1916 |
| 1,861,011 | Holmes | May 31, 1932 |
| 2,021,173 | Clark | Nov. 19, 1935 |
| 2,773,168 | Williams | Dec. 4, 1956 |